United States Patent [19]
Basiulis

[11] Patent Number: 4,862,708
[45] Date of Patent: Sep. 5, 1989

[54] OSMOTIC THERMAL ENGINE

[75] Inventor: Algerd Basiulis, Redondo Beach, Calif.

[73] Assignee: Hughes Aircraft Company, Los Angeles, Calif.

[21] Appl. No.: 192,267

[22] Filed: May 10, 1988

[51] Int. Cl.$^4$ ............................................. F25B 1/00
[52] U.S. Cl. ................................... 62/502; 62/498; 165/104.22; 417/207; 417/208; 417/209; 417/48
[58] Field of Search .................. 165/104.22; 62/502, 62/500, 498; 417/48, 207, 208, 209

[56] References Cited

U.S. PATENT DOCUMENTS

| | | | |
|---|---|---|---|
| 3,621,665 | 11/1971 | Mobadam | 417/207 |
| 3,645,111 | 2/1972 | Williamitis | 62/498 |
| 3,677,337 | 7/1972 | Midolo | 165/104.22 |
| 4,312,402 | 1/1982 | Basiulis | 165/104.22 |
| 4,315,539 | 2/1982 | Anderson et al. | 165/104.22 |
| 4,331,200 | 5/1982 | Basiulis et al. | 165/104.22 |
| 4,365,664 | 12/1982 | Basiulis | 165/104.22 |

OTHER PUBLICATIONS

C. P. Minning et al., "Development of an Osmotic Heat Pipe", AIAA Paper No. 78–442, 3rd International Heat Pipe Conference, Palo Alto, CA, May 22–24, 1978.

A. Basiulis et al., "Osmotically Pumped Energy Transport System", AIAA Paper No. 80-0210, AIAA 18th Aerospace Sciences Meeting, Pasadena, Calif., Jan. 14–16, 1980.

A. Basiulis et al., "Design, Development, and Test of a 1000 Watt Osmotic Heat Pipe", AIAA Paper No. 80-1482, AIAA 15th Thermophysics Conference, Snowmass, Colo., Jul. 14–16, 1980.

H. J. Tanzer et al., "Osmotic Pumped Heat Pipes for Large Space Platforms", AIAA Paper No. 82-0902, AIAA/ASME 3rd Joint Thermophysics, Fluids, Plazma and Heat Transfer Conference, St. Louis, MO, Jun. 7–11, 1982.

Primary Examiner—Albert W. Davis, Jr.
Attorney, Agent, or Firm—Paul M. Coble

[57] ABSTRACT

A thermal engine is disclosed which is operable as a heat pump, refrigerator, or air conditioner. Vaporized working fluid from a first evaporator, which extracts heat from elements desired to be cooled, is fed to a first region of an osmotic pump which also has a second region containing a solution of the working fluid and a preselected solute, the second region being separated from the first region by a membrane permeable to the vaporized working fluid but not to the solute. A second evaporator, which may be driven by waste heat, is operatively coupled to the second region of the osmotic pump by means of a counterflow heat exchanger having a first path for conveying relatively dilute solution from the second region of the osmotic pump to the second evaporator and a second path for conveying relatively concentrated solution from the second evaporator to the second region of the osmotic pump. Output heat from the thermal engine is obtained from a condenser which condenses vaporized working fluid from the second evaporator. The condensed working fluid undergoes constant enthalpy expansion, after which it is returned to the first evaporator.

19 Claims, 4 Drawing Sheets

OSMOTIC THERMAL ENGINE

The Government has rights in this invention pursuant to Contract No. F33615-85-C-2557 awarded by the Department of the Air Force.

TECHNICAL FIELD

This invention relates generally to the transfer of thermal energy, and more particularly relates to heat transfer arrangements employing an osmotic pump for both heat pump and cooler applications.

BACKGROUND OF THE INVENTION

Numerous instances exist in which the heating or cooling of a volume is desired. For example, the heating of a volume of space can provide environmental comfort, or the cooling of a spatial volume may provide protection against the overheating of electronic circuitry. In the past such devices have relied upon electrical power to drive mechanical compressors that enable one or more thermodynamic operational cycles to be sustained. Since moving mechanical parts can impair reliability and shorten device life, while the availability of electrical power is limited in certain applications such as those in space, heat pumps or coolers with no moving parts and in which the need for electrical power is reduced or even entirely eliminated would be highly desirable.

An achievement which has enabled advances to be made in the field of thermal engines was the development of the osmotic heat pipe. In an osmotic heat pipe two compartments, one containing a solution and the other containing pure solvent, are separated by a membrane which is permeable to the solvent only. The solution compartment is also connected to the solvent compartment through a path including an evaporator and a condensor. When heat is applied to the solution, solvent evaporates creating a concentration gradient which induces migration of the solvent near the membrane to the region of evaporation. The solute concentration becomes greater near the membrane, and fluid motion of solvent through the membrane is induced. The solvent vapor flows to the condensor where it condenses, giving up heat, after which it returns to the solvent compartment and flows through the membrane into the solution compartment. A steady-state condition prevails when the solvent evaporation rate is balanced by the solvent flow rate through the membrane.

An early osmotic heat pipe is disclosed in U.S. Pat. No. 3,677,337 to L. L. Midolo, and a detailed description of the theory, operation, and construction of osmotic heat pipes is given in the paper by C. P. Minning et al. "Development of an Osmotic Heat Pipe", AIAA Paper No. 78-442, 3rd International Heat Pipe Conference, Palo Alto, Calif., May 22-24, 1978. A further discussion of osmotic heat pipes including their application for heating and cooling is given in the paper by A. Basiulis et al., "Osmotically Pumped Energy Transport System", AIAA Paper No. 80-0210, AIAA 18th Aerospace Sciences Meeting, Pasadena, Calif., Jan. 14-16, 1980. Additional developments in osmotic heat pipe technology are described in the paper by A. Basiulis et al., "Design, Development, and Test of a 1000 Watt Osmotic Heat Pipe", AIAA Paper No. 80-1482, AIAA 15th Thermophysics Conference, Snowmass, Colo., Jul. 14-16, 1980, and adaptation of osmotic heat pipe technology to space applications is given in the paper by H. J. Tanzer et al., "Osmotic Pumped Heat Pipes for Large Space Platforms", AIAA Paper No. 82-0902, AIAA/ASME 3rd Joint Thermophysics, Fluids, Plasma and Heat Transfer Conference, St. Louis, Mo., June 7-11, 1982.

Improved osmotic heat pipes have been developed wherein passage of a convection current across the membrane is induced on the solution side by displacing freshly pumped solvent with a rich solute-solvent mixture. One arrangement for inducing such a convection current, disclosed in U.S. Pat. No. 4,331,200 to A. Basiulis, utilizes a pair of concentric tubes extending from the membrane region to the evaporator for establishing separate paths by which a weak solution diluted with freshly pumped solvent is caused to move from the membrane to the evaporator and a rich solute-solvent mixture is caused to move from the evaporator to the membrane. Another arrangement for achieving such a convection current is disclosed in U.S. Pat. No. 4,365,664 to A. Basiulis and provides separate lean and rich solution paths between the evaporator and the solution compartment, the rich solution path having a higher pressure drop than the lean solution path.

SUMMARY OF THE INVENTION

It is an object of the present invention to provide a simple and reliable thermal engine which has no moving parts.

It is a further object of the invention to provide a thermal engine of long life which can be driven by waste heat, and hence is inexpensive to operate.

It is another object of the invention to provide a reliable and durable thermal engine which is operable as a heat pump, refrigerator, or air conditioner.

It is still another object of the invention to provide a passive heat pump which does not require any electrical input power.

It is a still further object of the invention to provide a compact and light heat pump for space radiator applications which enables the radiator size to be reduced.

It is yet another object of the invention to provide a reliable, long life cryogenic cooler which is also inexpensive to operate.

It is a still further object of the invention to provide a thermal device specially suitable for automotive applications wherein both heating and air conditioning are required and which can be driven by waste heat from the automobile engine.

A thermal engine according to the invention includes a first evaporator containing a preselected working fluid capable of being vaporized by input heat. An osmotic pump has a first region for receiving vaporized working fluid from the first evaporator and a second region containing a solution of the working fluid and a preselected solute. A membrane permeable to the vaporized working fluid but not to the solute separates the first and second regions of the osmotic pump.

A second evaporator containing some of the solution of working fluid and solute is provided for vaporizing working fluid in response to further input heat. A counterflow heat exchanger having a first path for conveying a less concentrated portion of the solution from the second region of the osmotic pump to the second evaporator and having a second path for conveying a more concentrated portion of the solution from the second evaporator to the second region of the osmotic pump provides heat transfer from the second path to the first path.

Output heat from the thermal engine is obtained from a condenser which condenses vaporized working fluid from the second evaporator. The condensed working fluid undergoes constant enthalpy expansion, after which it is returned to the first evaporator.

Additional objects, advantages, and characteristic features of the invention will be apparent from the following detailed description of preferred embodiments of the invention when considered in conjunction with the accompanying drawings.

DETAILED DESCRIPTION OF THE INVENTION

Figure 1:
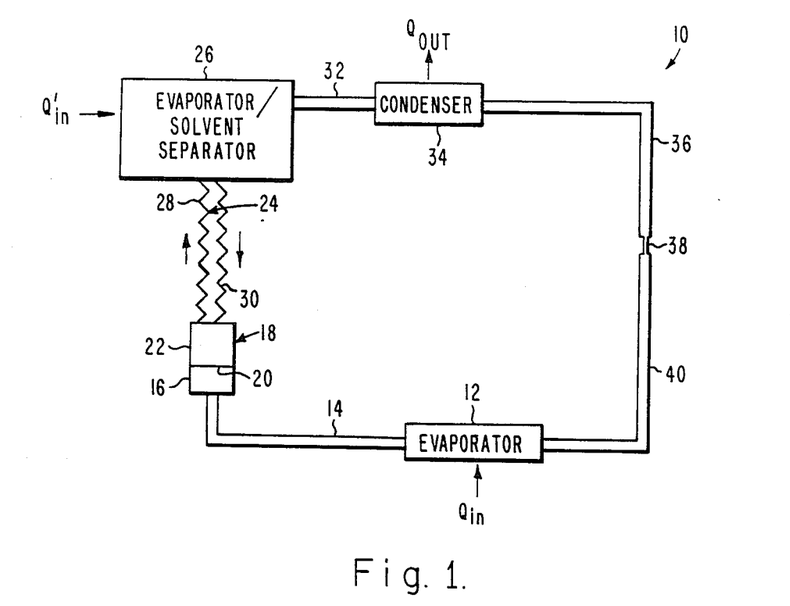
FIG. 1 is a block diagram illustrating an osmotic thermal engine according to the invention.

Referring to FIG. 1 with greater particularity, an osmotic thermal engine 10 according to the invention may be seen to include an evaporator 12 to which input heat $Q_{in}$ is applied. The input heat $Q_{in}$ may be heat from electronic components that are desired to be cooled in the case of a heat pump or a cryogenic refrigerator or hot air in the case of an air conditioner. The evaporator 12 contains a suitable working fluid which when vaporized extracts heat from the adjacent regions or elements. As a specific example for illustrative purposes, water may be used as the working fluid. However, it is pointed out that other working fluids such as ammonia, liquid metals such as sodium or potassium, methanol, or in the case of cryogenic refrigerators, nitrogen or oxygen, are also suitable and may be employed.

Vaporized working fluid from the evaporator 12 is applied via a conduit 14 to a solvent-containing compartment 16 of an osmotic pump 18 in which a solvent-permeable membrane 20 separates the compartment 16 from a solution-containing compartment 22. Specific details of a pair of exemplary osmotic pumps which may be employed in the thermal engine 10 will be discussed in more detail below with respect to FIGS. 3-4 and 5-6, respectively. At the present time, it will suffice to state that the membrane 20 is selected so that it is permeable to the working solvent but not to any solute that is added thereto, and the osmotic pump 18 is designed so that a suitable solute is present in the solution compartment 22 but not in the solvent compartment 16. As a specific example for illustrative purposes, when water is employed as the working fluid, the membrane 20 may be of cellulose acetate, and sucrose may be employed as the solute. As further examples, when the thermal engine 10 is to be operated at high temperatures, the membrane 20 may be of an organic material such as polybenzimidazole, and the solute may be aluminum sulfate; for liquid metal working fluids, the membrane 20 may be of a ceramic material such as alumina or zirconia, with liquid sodium or potassium being used as the solute.

The solution compartment 22 of the osmotic pump 18 is coupled via a counterflow heat exchanger 24 to a high temperature evaporator 26 which also functions as a solvent separator. The counterflow heat exchanger 24 provides two paths for the flow of working fluid: a first path 28 through which dilute solution (containing dissolved and entrapped working vapor) flows from the solution compartment 22 of the osmotic pump 18 to the evaporator/solvent separator 26, and a second path 30 through which concentrated solution (with dissolved and entrapped working vapor removed) flows from the evaporator/solvent separator 26 to the compartment 22. The counterflow heat exchanger 24 may comprise a pair of differently sized concentric tubes of a material of high thermal conductivity such as copper, with the inner tube providing one of the working fluid flow paths such as path 28 and the annular region between the inner and outer tubes providing the other working fluid flow path such as path 30.

When the thermal engine 10 is to be operated under normal conditions of gravity (i.e., other than in space) the evaporator/solvent separator 26 is located above the osmotic pump 18 so that gravity functions to maintain the desired working fluid flow through the heat exchanger 24. When the thermal engine 10 is to be operated in an environment where there is little or no gravity (such as is encountered in space), fluid flow-facilitating devices such as capillary wicks are employed in the evaporator/solvent separator 26. Specific details of an exemplary arrangement especially suitable for use in an environment of little or no gravity will be discussed below with respect to FIGS. 7 and 8.

Additional input heat designated $Q'_{in}$ is applied to the high temperature evaporator 26 at a higher temperature than that at which the heat $Q_{in}$ was applied to the evaporator 12. When the thermal engine 10 is operator as a heat pump, the heat $Q'_{in}$ may be waste heat from power generating equipment in the system in which the thermal engine 10 is contained. For automotive applications the heat $Q'_{in}$ may be waste heat from the automobile engine. For space applications the heat $Q'_{in}$ may be generated by concentrated solar energy, a radioactive isotope, or even a small nuclear reactor. When the thermal engine 10 is operated as a refrigerator, the heat $Q'_{in}$ may be supplied from a small electric heater.

Vaporized working fluid from the evaporator/separator 26 flows through a conduit 32 to a condensor 34 where it condenses into liquid and gives up heat $Q_{out}$ which constitutes the output heat from the thermal engine 10. Working liquid from the condensor 34 is fed via conduit 36 to a constant enthalpy expansion valve or capillary 38, after which it returns to the evaporator 12 via conduit 40.

Operation of the osmotic thermal engine 10 of FIG. 1 will now be described with reference to the temperature-entropy diagram of FIG. 2 wherein reference numeral 42 designates the saturation curve for the working fluid employed in the thermal engine 10. When input heat $Q_{in}$ is first applied to the evaporator 12 at a temperature $T_1$, the temperature-entropy condition for the thermal engine 10 is as shown by operating point a on FIG. 2. As the working fluid absorbs the input heat, its entropy increases along line 44 to point b, increasing the energy of the working fluid; however, the temperature remains at $T_1$, since all of the applied heat is used in vaporizing the working fluid. It should be noted that when the osmotic thermal engine 10 is operated as a refrigerator, a refrigeration effect occurs during this portion of the thermodynic operating cycle and is represented in FIG. 2 by the rectangular area bounded by the entropy axis, line 44, and dashed lines 45 and 46.

Vaporized working fluid from the evaporator 12 travels to the osmotic pump solvent compartment 16 where it initially adsorbs to the surface of the membrane 20. A concentration gradient builds up between the working fluid concentration level in the respective compartments 16 and 22, and as a result solvent working vapor flows through the membrane 20 into the solution compartment 22. In compartment 22 some of the working vapor is absorbed into the solution, part of the working vapor being dissolved and part being trapped as bubbles. The solution with its dissolved and entrapped working vapor flows through counterflow heat exchanger path 28 into the evaporator/solvent separator 26. In the evaporator/solvent separator 26 some of the solvent is vaporized by the applied heat $Q_{in}$, and dissolved and entrapped working vapor is released. The solution thus becomes more concentrated, and concentrated solution returns via heat exchanger path 30 to the osmotic pump compartment 22. As the concentrated solution travels along the heat exchanger path 30, it gives up heat (cools) and preheats the relatively dilute solution traveling in the opposite direction along heat exchanger path 28. Pressure is maintained throughout the loop including evaporator/separator 26, heat exchanger 24, and osmotic pump compartment 22 by the heat $Q_{in}$ applied to the evaporator/separator 26. The heat $Q_{in}$ also vaporizes absorbed solvent, thereby separating trapped vapor bubbles.

Figure 2:
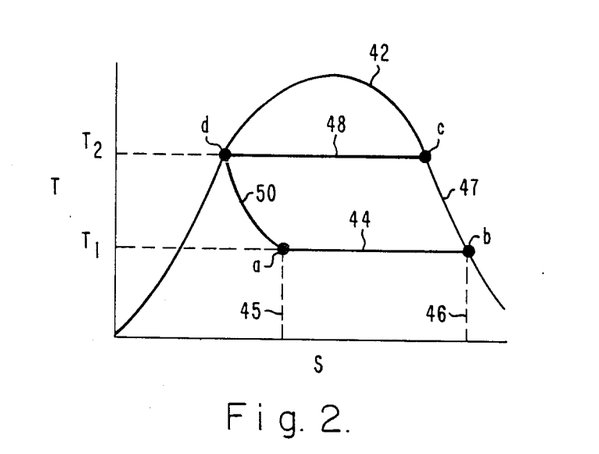
FIG. 2 is a temperature-entropy diagram showing the thermodynamic operating cycle for the thermal engine of FIG. 1.

As the absorbed vaporized working fluid traverses heat exchanger path 28 and as additional working fluid is vaporized by the heat $Q'_{in}$ applied to the evaporator/separator 26, the temperature-entropy condition of the working fluid moves along portion 47 of the saturation curve 42 to operating point c on FIG. 2. Thus, when the working vapor leaves the evaporator/separator 26 along conduit 32 the temperature of the working fluid has been increased to $T_2$. It should be noted that the entropy of point c is less than that of point b, which results from working vapor being absorbed into the solution in the osmotic pump compartment 22.

As the working vapor from the evaporator/separator 26 condenses into liquid in the condensor 34, it gives up heat to the adjacent region, thereby providing output heat $Q_{out}$ from the thermal engine 10. In the condensation process the temperature of the working fluid remains constant at $T_2$ while its entropy decreases, as the temperature-entropy condition moves from point c to point d along line 48 of FIG. 2.

When the working liquid passes through the capillary 38 it undergoes constant enthalpy expansion. In this expansion process the temperature of the working liquid decreases from $T_2$ to $T_1$. The working liquid pressure also decreases, allowing liquid molecules to become more active, thereby producing an increase in entropy. During the constant enthalpy expansion process the temperature-entropy condition moves from point d to point a along curve portion 50 of FIG. 2. The working liquid then returns to the evaporator 12, enabling the operating cycle to be repeated.

Figure 3:
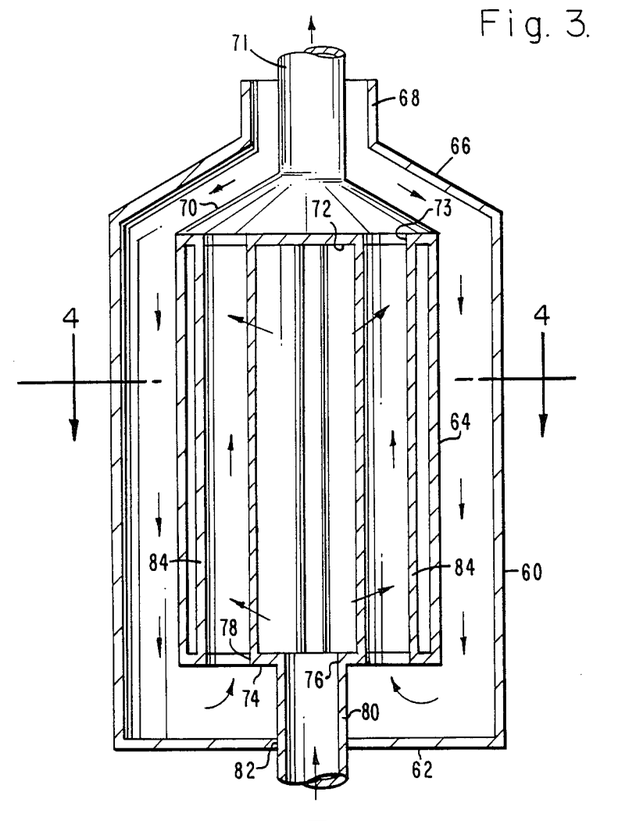
FIG. 3 is a longitudinal sectional view illustrating a particular osmotic pump which may be employed in the thermal engine of FIG. 1 according to one embodiment of the invention.
Figure 4:
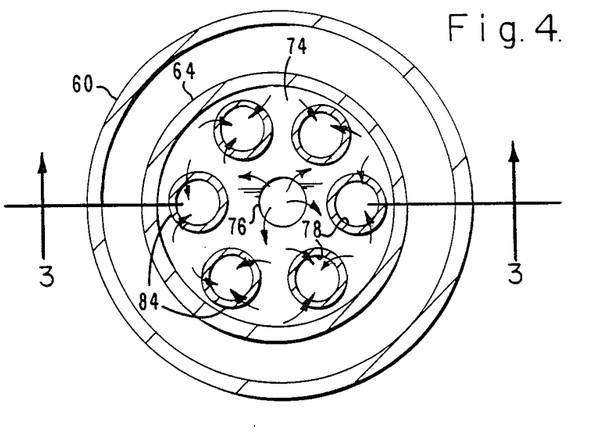
FIG. 4 is a cross-sectional view taken along line 4—4 of FIG. 3.

A specific exemplary arrangement which may be employed for the osmotic pump 18 is illustrated in FIGS. 3 and 4. The arrangement includes an outer cylindrical housing 60 having a base 62 and an inner cylindrical housing 64 coaxially disposed within the housing 60. The upper end of the housing 60 defines an inwardly projecting funnel portion 66 and a tubular portion 68 extending upwardly therefrom. The inner housing 64 defines a similar funnel portion 70 and tubular portion 71 coaxially disposed within the respective portions 66 and 68. A top plate 72 defining an array of apertures 73 extends across the upper end of the inner housing 64 just beneath the funnel portion 70.

The lower end of the inner housing 64 has a base portion 74 disposed parallel to and spaced from the base portion 62 of the outer housing 60. The base portion 74 defines a central aperture 76 and also defines an array of additional apertures 78 radially outwardly from the central aperture 76 and aligned with the apertures 73 in the top plate 72. A tube 80 extends downwardly from the base portion 74 about the aperture 76 through a central aperture 82 in the outer housing base portion 62. Disposed within inner housing 64 in alignment with and between respective aligned pairs of apertures 73 and 78 are a plurality of membrane tubes 84. The tubes 84 may be of any of the materials specified above for the membrane 20 and separate the solvent compartment (which is formed by a region within the inner housing 64 outside of the tubes 84) and the solution compartment (formed by the regions within the tubes 84 and between the inner housing 64 and the outer housing 60).

As shown by the arrows in FIGS. 3 and 4, solvent working vapor flows into the interior of inner housing 64 via tube 80 and through the walls of the membrane tubes 84 into the regions within the tubes 84 where the solution is contained. The solution, diluted with dissolved and entrapped working vapor, flows upwardly through the tubes 84 and funnel portion 70 into the inner tube 71 which constitutes path 28 of the counterflow heat exchanger 24. Return concentrated solution travels in the annular region between outer tube 68 and inner tube 71, which constitutes path 30 of the heat exchanger 24, and flows downwardly in the annular region between inner housing 64 and outer housing 60. The concentrated solution enters the membrane tubes 84 via the apertures 78 and is then mixed with fresh solvent working vapor passing through the walls of the membrane tubes 84.

Figure 5:
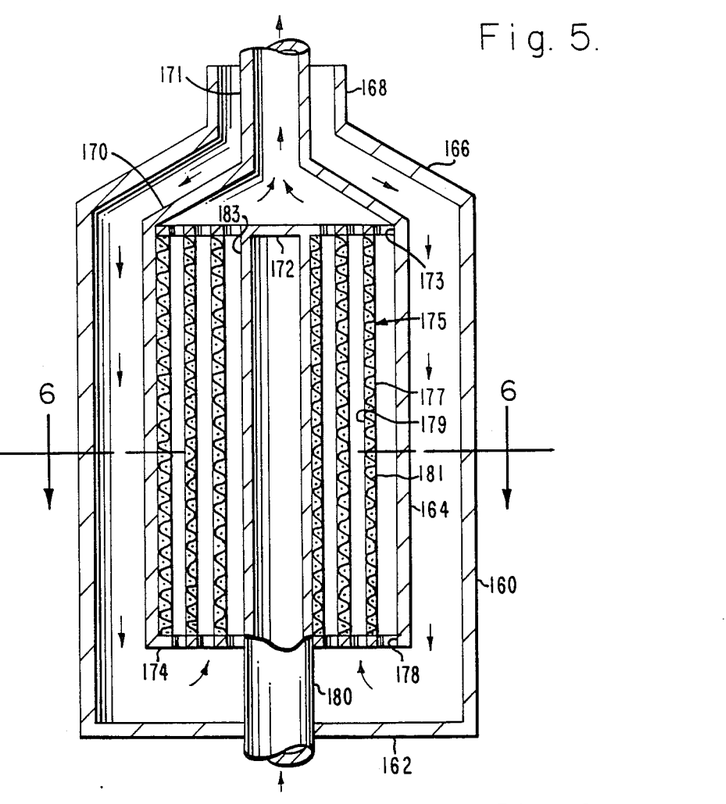
FIG. 5 is a longitudinal sectional view showing another osmotic pump which may be employed in the thermal engine of FIG. 1 in accordance with a further embodiment of the invention.
Figure 6:
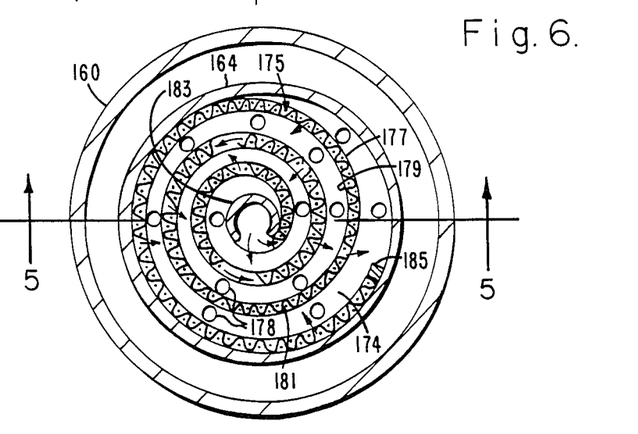
FIG. 6 is a cross-sectional view taken along line 6—6 of FIG. 5.

Another specific exemplary arrangement which may be employed for the osmotic pump 18 is illustrated in FIGS. 5 and 6. Components in the embodiment of FIGS. 5-6 which are the same as or equivalent to respective components in the embodiment of FIGS. 3-4 are designated by the same second and third reference numeral digits as their corresponding components in FIGS. 3-4, along with the addition of a prefix numeral "1".

In the embodiment of FIGS. 5-6, in lieu of membrane tubes a spiral membrane arrangement 175 is disposed within inner housing 164. The arrangement 175 comprises a pair of spaced spiral membrane members 177 and 179 of any of the materials specified above for the membrane 20, with a porous cloth or metal screen 181 interposed between the members 177 and 179 to provide rigidity and maintain a separation between the members 177 and 179. A tube 183 aligned with the tube 180 extends axially throughout the length of the inner housing 164, and the spiral membrane arrangement 175 extends from the outer surface of the tube 183 to the inner surface of the housing 164. The tube 183 defines an elongated opening communicating with the region between the membrane members 177 and 179 at the inner end of the spiral arrangement 175. The outer ends of the members 177 and 179 are sealed together by a longitudinally extending strip 185.

The osmotic pump of FIGS. 5-6 operates in a manner similar to that described above with respect to the osmotic pump of FIGS. 3-4. However, in the arrangement of FIGS. 5-6 the interior region of the tube 183 and the region within the spiral arrangement 175 (i.e., the region between the membrane members 177 and 179 where the screen 181 is contained) function as the solvent compartment, while the annular space between outer housing 160 and inner housing 164 and the spiral space between adjacent turns of the arrangement 175 function as the solution compartment.

As was mentioned above, when the thermal engine 10 is to be operated in an environment such as is encountered in space where there is little or no gravity, a modified evaporator/solvent separator 26 is employed to facilitate the desired flow of the dilute and concentrated solutions into and out of the heat exchanger 24. A specific exemplary evaporator/solvent separator 26 which may be employed in such an environment is illustrated in FIGS. 7 and 8.

Figure 7:
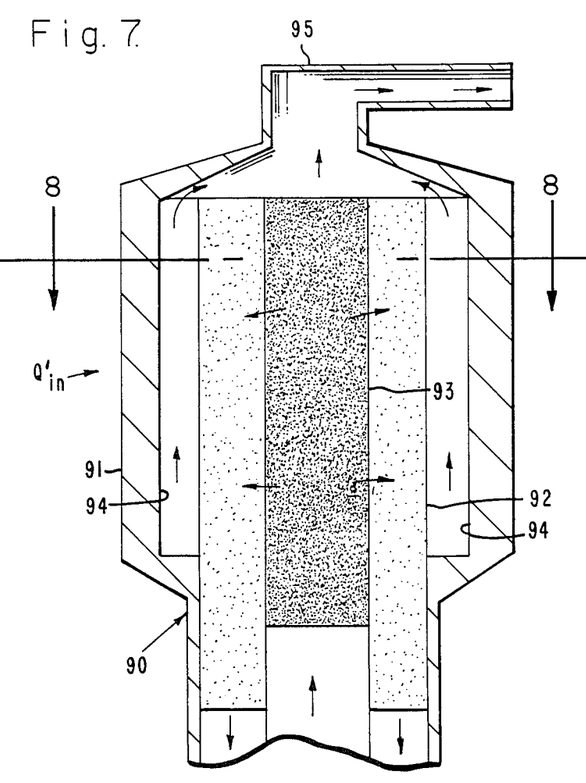
FIG. 7 is a longitudinal sectional view illustrating a particular evaporator/solvent separator which may be employed in the thermal engine of FIG. 1 when the thermal engine is used in space applications.
Figure 8:
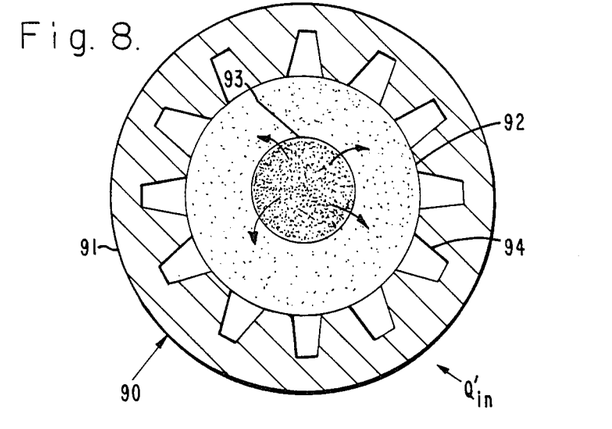
FIG. 8 is a cross-sectional view taken along line 8—8 of FIG. 7.

The evaporator/solvent separator of FIG. 7-8 includes a substantially cylindrical housing 90 of a material of high thermal conductivity such as copper. Housing 90 has a radially enlarged portion 91 near its end from which vaporized working fluid flows to the condenser 34. Since the concentrated solution has a higher surface tension than the dilute solution, different sized wicks are employed within the housing 90 to separate the two solutions. Thus, as shown in FIGS. 7-8, a first wick 92 of relatively large porosity is disposed in the housing 90 adjacent to an interior wall thereof to convey concentrated solution to path 30 of the heat exchanger 24, and a second wick 93 of relatively small porosity is disposed within the housing 90 adjacent to the wick 92 and spaced from the housing interior wall to receive and convey dilute solution from the heat exchanger path 28. The wicks 92 and 93 may be composed of foam metal, wire screens, metal sponges, or knitted mesh, for example.

In the specific exemplary arrangement illustrated in FIGS. 7-8, the wick 92 has a substantially tubular configuration and is coaxially disposed in the housing 90 with its outer lateral surface contacting a portion of the inner lateral wall of the housing 90. The wick 93 has a substantially cylindrical configuration and is coaxially disposed in the housing 90 radially within the wick 92 with its lateral surface contacting a portion of the inner lateral surface of the wick 92. As shown, the outer wick 92 may extend slightly beyond the inner wick 93 in a longitudinal direction toward the heat exchanger 24.

In order to provide a flow path for vaporized working fluid, the inner lateral wall of the enlarged housing portion 91 is provided with a plurality of circumferentially spaced longitudinally extending slots 94 adjacent to a portion of the outer lateral surface of the wick 92. The ends of each of the slots 94 away from the heat exchanger 24 open into a passageway 95 for feeding vaporized working fluid from the evaporator/solvent separator of FIGS. 7-8 to the condenser 34.

It will be apparent from the foregoing description that a thermal engine according to the invention has no moving parts subject to mechanical wear which can lead to eventual breakdown. Therefore, a thermal engine of improved reliability and longer life is achieved. Moreover, since the heat $Q'_{in}$ in applied to the evaporator/solvent separator 26 may be waste heat from power generating equipment in the system in which the thermal engine 10 is contained (for example, an automobile engine in automotive applications or solar energy in space applications), the need for electrical input power is reduced or even eliminated entirely in some applications. Thus, a thermal engine according to the invention is relatively inexpensive to operate. In addition, since a heat pump according to the invention is capable of giving off heat at a substantially higher temperature than its input heat, and since the surface area required to radiate a given quantity of heat into space is significantly reduced as a function of the temperature at which the heat is emitted, the present invention provides a compact and light heat pump for space radiator applications which enables the radiator size to be reduced. Thus, the present invention provides a reliable, durable, and versatile thermal engine which is operable as a heat pump, refrigerator, or air conditioner.

Although the present invention has been shown and described with respect to particular embodiments, nevertheless, various changes and modifications which are obvious to a person skilled in the art to which the invention pertains are deemed to lie within the spirit, scope, and contemplation of the invention.

What is claimed is:

1. A thermal engine comprising:
   a first evaporator containing a preselected working fluid capable of being vaporized by input heat;
   an osmotic pump having a first region for receiving vaporized working fluid from said first evaporator, a second region containing a solution of said working fluid and a preselected solute, and membrane means permeable to said vaporized working fluid but not to said solute for separating said first and second regions;
   a second evaporator containing some of said solution for vaporizing working fluid therefrom in response to further input heat;
   counterflow heat exchanger means having a first path for the flow of a less concentrated portion of said solution from said second region of said osmotic pump to said second evaporator and having a second path for the flow of a more concentrated portion of said solution from said second evaporator to said second region of said osmotic pump for providing heat transfer from said second path to said first path;
   condenser means for condensing vaporized working fluid from said second evaporator, whereby output heat is provided from said thermal engine;
   expansion means for providing constant enthalpy expansion of condensed working fluid from said condensor means; and
   means for returning expanded condensed working fluid from said expansion means to said first evaporator.

2. A thermal engine according to claim 1 wherein said output heat is provided at a temperature higher than the temperature of said input heat to said first evaporator.

3. A thermal engine according to claim 1 wherein said further input heat to said second evaporator is at a higher temperature than said input heat to said first evaporator.

4. A thermal engine according to claim 1 wherein said less concentrated portion of said solution contains dissolved and entrapped vaporized working fluid from said first evaporator.

5. A thermal engine according to claim 1 wherein at least said further input heat is waste heat from power generating equipment in a system in which said thermal engine is employed.

6. A thermal engine according to claim 1 wherein said counterflow heat exchanger comprises a pair of differently sized concentrically disposed tubes of a material of high thermal conductivity, the inner one of said tubes providing said first path and the annular region between said tubes providing said second path.

7. A thermal engine according to claim 1 wherein said second evaporator is located above said osmotic pump, whereby gravity functions to maintain the flow of said less concentrated portion and said more concentrated portion of said solution through said counterflow heat exchanger.

8. A thermal engine according to claim 1 wherein said expansion means is an expansion valve.

9. A thermal engine according to claim 1 wherein said expansion means is a capillary tube.

10. A thermal engine according to claim 1 wherein said osmotic pump comprises:
an outer cylindrical housing;
an inner cylindrical housing coaxially disposed within said outer housing;
a plurality of membrane tubes disposed within said inner housing with their respective axes parallel to the axis of said inner housing, the walls of said membrane tubes being permeable to said vaporized working fluid but not to said solute;
means for introducing vaporized working fluid from said first evaporator to the region within said inner housing outside of said membrane tubes;
means at one end of said membrane tubes for providing fluid communication between the interior regions of said membrane tubes and said first path of said counterflow heat exchanger means;
means for providing fluid communication between said second path of said counterflow heat exchanger means and the annular region between said inner and outer housings; and
means at the other end of said membrane tubes for providing fluid communication between said annular region and the interior regions of said membrane tubes.

11. A thermal engine according to claim 1 wherein said osmotic pump comprises:
an outer cylindrical housing;
an inner cylindrical housing coaxially disposed within said outer housing;
a spiral membrane arrangement including a pair of spaced spiral membrane members disposed within said inner housing and extending substantially between the axial region and the peripheral region of said inner housing, the walls of said membrane members being permeable to said vaporized working fluid but not to said solute;
means for introducing vaporized working fluid from said first evaporator to the region within said membrane arrangement between said membrane members;
means at one end of said inner housing for providing fluid communication between the spiral space between adjacent turns of said membrane arrangement and said first path of said counterflow heat exchanger means;
means for providing fluid communication between said second path of said counterflow heat exchanger means and the annular region between said inner and outer housings; and
means at the other end of said inner housing for providing fluid communication between said annular region and the spiral space between adjacent turns of said membrane arrangement.

12. A thermal engine according to claim 11 wherein said membrane arrangement includes means disposed between said membrane members for providing rigidity and maintaining a desired separation therebetween.

13. A thermal engine according to claim 1 wherein said second evaporator comprises:
a housing of a material of high thermal conductivity;
first wick means disposed in said housing for conveying said more concentrated portion of said solution;
second wick means disposed in said housing adjacent to said first wick means for conveying said less concentrated portion of said solution, said second wick means having a smaller porosity than said first wick means; and
means for providing a flow path for working fluid vaporized in said second evaporator.

14. A thermal engine according to claim 1 wherein said second evaporator comprises:
a housing of a material of high thermal conductivity;
a first wick disposed in said housing adjacent to an interior wall thereof;
a second wick disposed in said housing adjacent to said first wick and spaced from said housing interior wall, said second wick having a smaller porosity than said first wick; and
said housing interior wall defining a plurality of elongated slots adjacent to said first wick.

15. A thermal engine according to claim 14 wherein said first wick has a greater longitudinal extent than said second wick.

16. A thermal engine according to claim 14 wherein said housing has a substantially cylindrical configuration, said first wick has a substantially tubular configuration and is coaxially disposed in said housing with its outer lateral surface contacting a portion of the inner lateral wall of said housing, said second wick has a substantially cylindrical configuration and is coaxially disposed in said housing radially within said first wick with its lateral surface contacting at least a portion of the inner lateral surface of said first wick, and said elongated slots are circumferentially spaced along the inner lateral wall of said housing and extend in a direction parallel to the axis of said housing.

17. A heat pump comprising:
a first evaporator containing a preselected working fluid capable of being vaporized by input heat at a first temperature;
an osmotic pump having a first region for receiving vaporized working fluid from said first evaporator, a second region containing a solution of said working fluid and a preselected solute, and membrane means permeable to said vaporized working fluid but not to said solute for separating said first and second regions;

a second evaporator containing some of said solution for vaporizing working fluid therefrom in response to further input heat;

counterflow heat exchanger means having a first path for the flow of a less concentrated portion of said solution from said second region of said osmotic pump to said second evaporator and having a second path for the flow of a more concentrated portion of said solution from said second evaporator to said second region of said osmotic heat pump for providing heat transfer from said second path to said first path;

condenser means for condensing vaporized working fluid from said second evaporator, whereby output heat is provided from said heat pump at a second temperature higher than said first temperature;

expansion means for providing constant enthalpy expansion of condensed working fluid from said condensor means; and means for returning expanded condensed working fluid from said expansion means to said first evaporator.

18. A refrigerator comprising:

a first evaporator containing a preselected working fluid capable of being vaporized by input heat from elements to be cooled as said working fluid is vaporized;

an osmotic pump having a first region for receiving vaporized working fluid from said first evaporator, a second region containing a solution of said working fluid and a preselected solute, and membrane means permeable to said vaporized working fluid but not to said solute for separating said first and second regions;

a second evaporator containing some of said solution for vaporizing working fluid therefrom in response to further input heat;

counterflow heat exchanger means having a first path for the flow of a less concentrated portion of said solution from said second region of said osmotic pump to said second evaporator and having a second path for the flow of a more concentrated portion of said solution from said second evaporator to said second region of said osmotic heat pump for providing heat transfer from said second path to said first path;

condenser means for condensing vaporized working fluid from said second evaporator, whereby output heat is provided from said refrigerator;

expansion means for providing constant enthalpy expansion of condensed working fluid from said condensor means; and means for returning expanded condensed working fluid from said expansion means to said first evaporator.

19. An air conditioner comprising:

a first evaporator containing a preselected working fluid capable of being vaporized by input heat from air to be cooled as said working fluid is vaporized;

an osmotic pump having a first region for receiving vaporized working fluid from said first evaporator, a second region containing a solution of said working fluid and a preselected solute, and membrane means permeable to said vaporized working fluid but not to said solute for separating said first and second regions;

a second evaporator containing some of said solution for vaporizing working fluid therefrom in response to further input heat;

counterflow heat exchanger means having a first path for the flow of a less concentrated portion of said solution from said second region of said osmotic pump to said second evaporator and having a second path for the flow of a more concentrated portion of said solution from said second evaporator to said second region of said osmotic heat pump for providing heat transfer from said second path to said first path;

condenser means for condensing vaporized working fluid from said second evaporator, whereby output heat is provided from said air conditioner;

expansion means for providing constant enthalpy expansion of condensed working fluid from said condensor means; and means for returning expanded condensed working fluid from said expansion means to said first evaporator.

* * * * *